United States Patent
Brantley et al.

(10) Patent No.: US 8,129,059 B2
(45) Date of Patent: Mar. 6, 2012

(54) LOW PRESSURE DROP FUEL PROCESSOR FOR USE WITH PORTABLE FUEL CELLS

(75) Inventors: Jennifer E. Brantley, Dublin, CA (US); Ian W. Kaye, Livermore, CA (US); Hiep T. Nguyen, San Francisco, CA (US)

(73) Assignee: UltraCell, L.L.C., Commack, NY (US)

(*) Notice: Subject to any disclaimer, the term of this patent is extended or adjusted under 35 U.S.C. 154(b) by 0 days.

(21) Appl. No.: 12/389,158

(22) Filed: Feb. 19, 2009

(65) Prior Publication Data
US 2009/0214910 A1 Aug. 27, 2009

Related U.S. Application Data

(60) Provisional application No. 61/030,791, filed on Feb. 22, 2008.

(51) Int. Cl.
*H01M 8/06* (2006.01)
(52) U.S. Cl. ............... 429/423; 429/408; 429/416
(58) Field of Classification Search .............. 429/20, 429/29, 408, 416, 423
See application file for complete search history.

(56) References Cited

U.S. PATENT DOCUMENTS

| | | | |
|---|---|---|---|
| 6,451,464 B1 * | 9/2002 | Edlund et al. | 429/411 |
| 6,585,785 B1 * | 7/2003 | Warren et al. | 48/127.9 |
| 7,476,455 B2 | 1/2009 | Edlund | |
| 2003/0157002 A1 * | 8/2003 | Andel et al. | 422/198 |
| 2005/0011125 A1 * | 1/2005 | Kaye et al. | 48/94 |
| 2005/0084388 A1 * | 4/2005 | Hayes et al. | 417/222.1 |
| 2005/0186455 A1 * | 8/2005 | Kaye et al. | 429/17 |
| 2006/0156627 A1 * | 7/2006 | Brantley et al. | 48/61 |
| 2008/0016767 A1 | 1/2008 | Brantley et al. | |

OTHER PUBLICATIONS

Holladay et al., "Miniature Fuel Processors for Portable Fuel Cell Supplies," Nov. 26, 2002, Battelle Pacific Northwest Division, Richland, WA.*
International Search Report dated Apr. 21, 2009 in PCT Application No. PCT/US2009/034517.
Written Opinion dated Apr. 21, 2009 in PCT Application No. PCT/US2009/034517.

* cited by examiner

*Primary Examiner* — Keith Hendricks
*Assistant Examiner* — Eli Mekhlin
(74) *Attorney, Agent, or Firm* — Keusey & Associates, P.C.

(57) ABSTRACT

The invention relates to a fuel processor that produces hydrogen from a fuel and includes a low pressure drop burner. The low pressure drop burner permits the use of a low pressure air supply such as a fan to move products and reactants through the burner.

19 Claims, 8 Drawing Sheets

LOW PRESSURE DROP FUEL PROCESSOR FOR USE WITH PORTABLE FUEL CELLS

CROSS-REFERENCE TO RELATED APPLICATIONS

This application claims priority under 35 U.S.C. §119(e) to: U.S. Provisional Patent Application No. 61/030,791 filed on Feb. 22, 2008 entitled "Low Pressure Drop Fuel Processor", which is incorporated by reference for all purposes.

U.S. GOVERNMENT RIGHTS

This application was made in part with government support awarded by the Defense Microelectronics Activity under contract number H94003-07-C-0711 The government has certain rights in the invention.

FIELD OF THE INVENTION

The present invention relates to fuel cell technology. In particular, the invention relates to portable fuel processors configured with a low pressure drop for reactant and product gas movement in a burner.

BACKGROUND

A fuel cell electrochemically combines hydrogen and oxygen to produce electricity. The ambient air readily supplies oxygen. Hydrogen provision, however, calls for a working supply.

A reformed hydrogen supply converts a fuel into hydrogen. The fuel acts as a hydrogen carrier, is processed to separate hydrogen, and may include a hydrocarbon fuel, for example.

A fuel processor reforms the fuel to produce the hydrogen. While large and stationary fuel cell systems have matured as a technology, portable fuel cell systems for portable applications are still overcoming unmet technical challenges. Portable fuel cell systems offer constraints that are overlooked in a stationary fuel cell system. Space, weight, orientation independence, changing location of use, and system efficiency are all constraints that prevent components used in large stationary systems from being simply downsized into a smaller portable system.

Provision of air to a fuel processor in a stationary fuel cell system readily uses any suitable number or size fans and compressors. For air provision in a portable system, however, a small fan cannot supply enough pressure for the tight dimensions and plumbing of a portable fuel processor. Small compressors are then typically used in portable systems. However, even the smallest compressors require substantial space and weight for a portable package, and are noisy, costly and unreliable.

It should be apparent that portable fuel cell systems need to find new techniques for air provision.

SUMMARY

The present invention relates to a fuel processor that produces hydrogen from a fuel and includes a low pressure drop burner. The low pressure drop burner permits the use of a low pressure air supply such as a fan to move products and reactants through the burner.

In one aspect, the present invention relates to a fuel processor for producing hydrogen from a fuel. The fuel processor includes a burner and a reformer configured to receive reformer fuel and to output hydrogen. The burner includes i) a burner chamber, ii) a burner chamber air inlet configured to receive air, iii) a burner chamber fuel inlet configured to receive burner fuel, and iv) a catalyst in the burner chamber that is selected to facilitate combustion of the burner fuel, and v) a burner chamber outlet configured to output combustion exhaust from the burner chamber. The burner is configured to permit air flow from the burner chamber air inlet to the burner chamber outlet and though the burner chamber with a pressure drop less than about 50 Pa.

In another aspect, the present invention relates to a fuel processor for producing hydrogen from a fuel. The fuel processor includes a burner and a reformer. The burner includes: i) a burner chamber with a volume less than about 5 cubic centimeters, ii) a burner chamber air inlet configured to receive air, iii) a burner chamber fuel inlet configured to receive burner fuel, iv) a catalyst in the burner chamber that is selected to facilitate combustion of the burner fuel, v) a burner chamber outlet configured to output combustion exhaust from the burner chamber, vi) no turns in the burner chamber from the burner chamber air inlet to the burner chamber outlet, vii) a length less than about 15 centimeters between the burner chamber air inlet and the burner chamber outlet.

In yet another aspect, the present invention relates to a portable fuel cell system. The system includes a fuel cell, a fuel processor, and a low pressure air supply. The fuel processor includes a low pressure drop burner chamber. The fuel cell is configured to receive hydrogen from the fuel processor and to output electrical energy. The low pressure air supply is positioned to move air through the burner chamber, wherein the low pressure air supply is configured to provide a pressure that is less than about 50 Pa and is configured to supply air at a flow rate that is less than about 50 liters per minute to the burner chamber.

These and other features of the present invention will be described in the following description of the invention and associated figures.

DETAILED DESCRIPTION OF THE PREFERRED EMBODIMENTS

The present invention is described in detail with reference to a few preferred embodiments as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

A fuel processor as described herein includes a low pressure drop burner. The low pressure drop burner permits the use of a fan or other low pressure air source to provide air to a burner in a portable fuel processor.

Fuel Cell System

Figure 1:
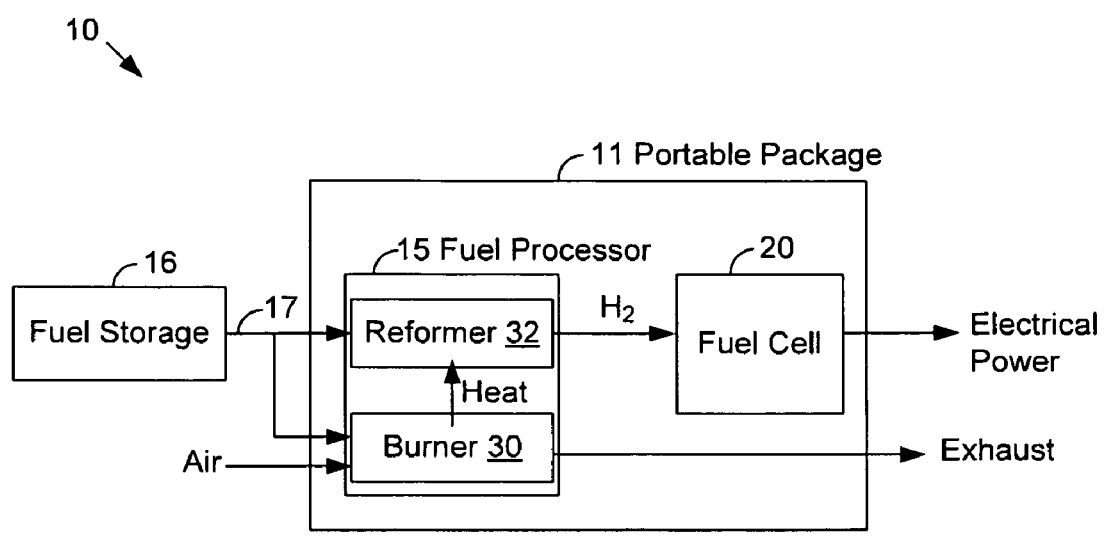
FIG. 1 illustrates a portable package including a fuel cell system in accordance with one embodiment of the present invention.

FIG. 1 illustrates a fuel cell system 10 for producing electrical energy in accordance with one embodiment of the present invention. The 'reformed' hydrogen system 10 processes a fuel 17 to produce hydrogen for supply to fuel cell 20. As shown, the reformed hydrogen supply includes a fuel processor 15 and a fuel storage device 16.

Storage device 16 (or 'cartridge') stores a fuel 17, and may comprise a refillable and/or disposable fuel cartridge. Either design permits recharging capability for a fuel cell system or electronics device by swapping a depleted cartridge for one with fuel.

Fuel 17 acts as a carrier for hydrogen and can be processed or manipulated to separate hydrogen. As the terms are used herein, 'fuel', 'fuel source' and 'hydrogen fuel source' are interchangeable and all refer to any fluid (liquid or gas) that can be manipulated to separate hydrogen. Fuel 17 may include any hydrogen bearing fuel stream, hydrocarbon fuel or other source of hydrogen such as ammonia. Currently available hydrocarbon fuels 17 suitable for use with the present invention include gasoline, $C_1$ to $C_4$ hydrocarbons, their oxygenated analogues and/or their combinations, for example. Other fuel sources may be used with a fuel cell package of the present invention, such as sodium borohydride. Several hydrocarbon and ammonia products may also be used. Liquid fuels 17 offer high energy densities and the ability to be readily stored and shipped. In a specific embodiment, fuel 17 includes a water/methanol mixture of about 1.1:1.

Fuel processor 15 processes fuel 17 and outputs hydrogen. In one embodiment, a hydrocarbon fuel processor 15 heats and processes a hydrocarbon fuel 17 in the presence of a catalyst to produce hydrogen. Fuel processor 15 comprises a reformer 32 and a burner 30.

Reformer 32 is a catalytic device that converts a liquid or gaseous fuel 17 into hydrogen and carbon dioxide. As the term is used herein, reforming refers to the process of producing hydrogen from a fuel 17. Fuel processor 15 may output either pure hydrogen or a hydrogen bearing gas stream (also commonly referred to as 'reformate').

Hydrogen production in reformer 32 is slightly endothermic and draws heat from heater/burner 30. In one embodiment, burner 30 employs catalytic combustion to generate heat. As the term is used herein, a burner refers to a heater that uses a catalytic process to produce heat.

Various types of reformers are suitable for use in fuel cell system 10; these include steam reformers, auto thermal reformers (ATR) and catalytic partial oxidizers (CPOX) for example. A steam reformer only needs steam and fuel to produce hydrogen. ATR and CPOX reformers mix air with a fuel/steam mixture. ATR and CPOX systems reform fuels such as methanol, diesel, regular unleaded gasoline and other hydrocarbons. In a specific embodiment, storage device 16 provides methanol 17 to fuel processor 15, which reforms the methanol at about 280° C. or less and allows fuel cell system 10 use in low temperature applications.

Fuel cell 20 electrochemically converts hydrogen and oxygen to water, generating electrical energy (and sometimes heat) in the process. Ambient air readily supplies oxygen. A pure or direct oxygen source may also be used. The water often forms as a vapor, depending on the temperature of fuel cell 20. For some fuel cells, the electrochemical reaction may also produce carbon dioxide as a byproduct.

Fuel processors of the present invention are well suited for use with micro and portable fuel cell systems. A micro fuel cell system generates dc voltage, and may be used in a wide variety of applications. Fuel processor 15 and fuel cell 20 are included in a portable package 11. Electrical energy generated by a micro fuel cell may power a notebook computer or another electronics device carried by military personnel, for example. In one embodiment, the present invention provides 'small' fuel cells that are included in a portable package 11 and configured to output less than 200 watts of power (net or total). In one embodiment, the fuel cell 20 is configured to generate from about 1 milliwatt to about 200 Watts. In another embodiment, the fuel cell 20 generates from about 5 Watts to about 60 Watts. Fuel cell system 10 may be a stand-alone system, which is a single package 11 that produces power as long as it has access to a) oxygen and b) hydrogen or a hydrogen source such as a hydrocarbon fuel. One specific portable fuel cell package produces about 20 Watts or about 45 Watts, depending on the number of cells in the stack.

Having discussed an overview of fuel cell systems and fuel processors, details on low pressure drop embodiments will now be provided.

Low Pressure Drop Fuel Processors

The embodiments described herein provide a low pressure drop for the movement of product and reactant gases in one or more chambers in a fuel processor. This permits the use of a low pressure air source such as a blower or fan, either of which is almost 20 decibels quieter than a standard air compressor.

In one embodiment, a 'low pressure drop' is defined as less than about 50 Pascals (Pa). In another specific embodiment, low pressure is defined as less than about 25 Pa. A wide variety of vendors provide blowers, fans and other air moving devices in this pressure range. In a specific embodiment, blowers and fans in these pressure ranges, as provided by Sunon of Brea, Calif., are suitable for use. Other low pressure air sources can be added as needed. Some compact and efficient blowers are capable or providing up to 150 Pa pressure output and these may also be used. A 'blower' refers an air-moving package that includes a side outlet relative to an axis for its motorized axis, such as one of those available from a wide variety of vendors. In each case, the desired outcome is that a loud, large, heavy and expensive compressor can be substituted for a lighter, more durable, quieter and more cost effective blower or fan.

Since blowers, and fans, are limited to low output pressures compared to compressors of a similar size, the fuel processor is configured to permit low pressure air sources to service the fuel processor and feed a burner or reformer with reactant gases. In one embodiment, the fuel processor is configured to reduce pressure losses along the fluidic path of each inlet air stream and exhaust stream to thereby reduce pressure source demands.

The fuel processor embodiments from FIGS. 2-13 provide numerous low pressure drop designs for the movement of product and reactant gases through one or more chambers in a fuel processor. This permits the use of a blower or a fan instead of an air compressor in driving product gases into the fuel processor.

Figure 2:
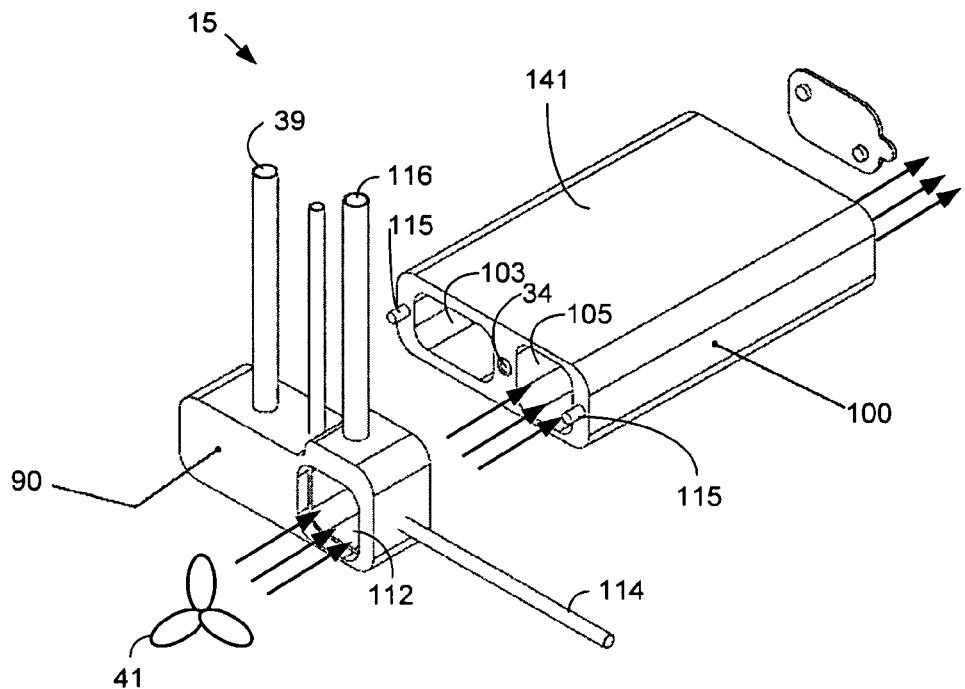
FIG. 2 shows a top perspective view of a low pressure drop fuel processor in accordance with a specific embodiment.

FIG. 2 shows a top perspective view of components included in a low pressure drop fuel processor 15 in accordance with a specific embodiment. Fuel processor 15 reforms methanol to produce hydrogen. The low pressure drop fuel processor 15 of FIG. 2 includes three components separated for sake of illustration: a fuel adapter 90, a monolithic body 100, and air pressure source 41.

Fuel adapter 90 serves as a fluid mixing and storage chamber and includes an air inlet 112 and a burner fuel inlet 114 for a burner chamber 103 included in monolithic body 100.

Monolithic structure 100 includes reformer 32, burner 30 and boiler 34. As the term is used herein, 'monolithic' refers to a single and integrated structure. In one embodiment, monolithic structure 100 includes a single material 141 that forms walls for a reformer chamber 103 and burner chamber 105. The single material may comprise a metal, such as copper, silicon, stainless steel, inconel and other metal/alloys displaying favorable thermal conducting properties. The metal facilitates conductive heat transfer within the fuel processor. As shown, holes and spaces in the material 141 form chambers for reformer 32, burner 30 and boiler 34. The monolithic structure 100 and common material 141 simplify manufacture of fuel processor 15. For example, using a metal for common material 141 allows monolithic structure 100 to be formed by extrusion to shape reformer 32, burner 30 and boiler 34. In a specific embodiment, monolithic structure 100 is consistent in cross sectional dimensions between opposite ends and solely comprises copper formed in a single extrusion.

Figure 3:
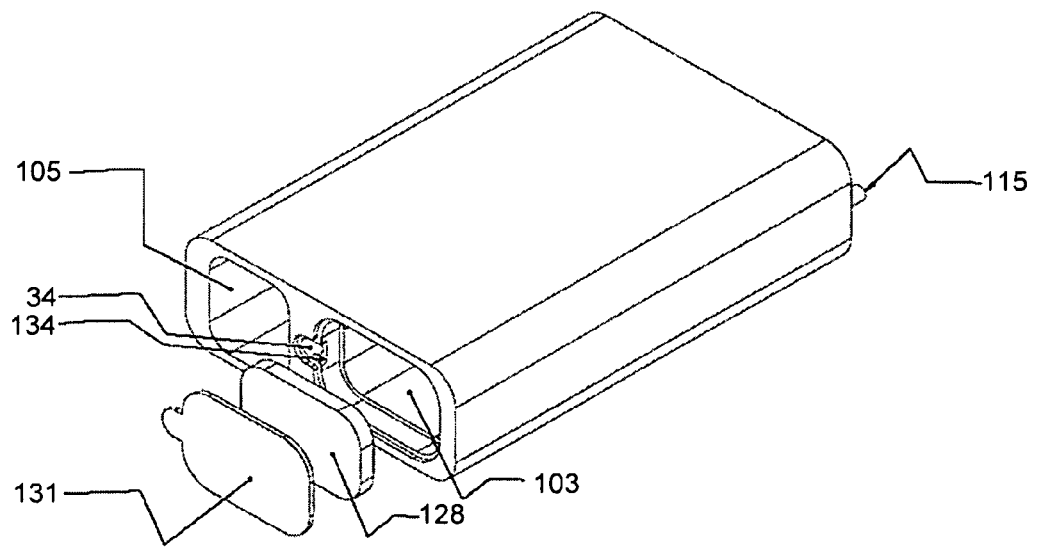
FIG. 3 shows an external perspective view of the monolithic structure included in the fuel processor of FIG. 2 from the opposite top perspective view shown in FIG. 2.
Figure 4:
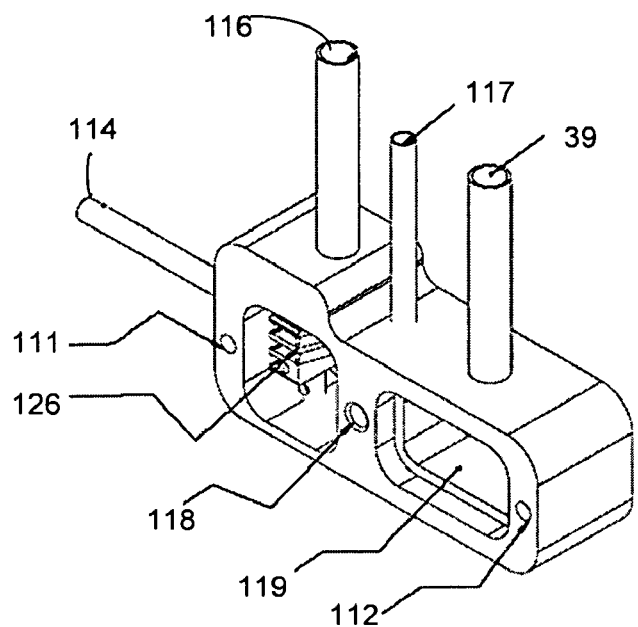
FIG. 4 shows an exploded external perspective view of the adapter from FIG. 2.

FIG. 3 shows an external perspective view of monolithic structure 100 from the opposite end shown in FIG. 2. FIG. 4 shows an exploded external perspective view of adapter 90 from FIG. 2.

Referring to FIG. 2, burner 30 includes a burner chamber 105 in which fuel combustion occurs to generate heat for fuel processor 15. Burner 30 is configured with a low pressure drop for reactants and products moving through burner chamber 105.

First, as shown, burner 30 includes a single burner chamber 105 that notably includes no turns from the burner chamber air inlet to the burner chamber outlet. More specifically, air and fuel pass through burner chamber 105 from one end to the other without having to navigate corners and their resultant pressure increases. In one embodiment, burner chamber 105 includes a length less than about 15 centimeters from the burner chamber air inlet to the burner chamber outlet.

Burner chamber 105 also begins and end with large openings on both ends and allows reactant and products gases to easily enter and exit with minimal pressure increases due to smaller inlet and exit ports.

Collectively, the straight configuration of burner chamber 105 and large inlet and outlet ports allow burner 30 reactants and products to move through the burner chamber 105 and across the burner catalyst contained in the chamber while witnessing a low pressure drop.

The burner chamber 105 contains a combustion catalyst that combusts air with the fuel. The burner catalyst may be wash coated on the burner chamber 105 walls. In another embodiment, burner chamber 105 is filled with monolith, microlith, and wrapped pellet catalysts. In a specific embodiment, the burner catalyst is coated onto pellets with a diameter less than about ⅛ inch. Suitable burner catalysts may include platinum or palladium coated onto alumina pellets for example. Other materials suitable for catalyst include iron, tin oxide, other noble-metal catalysts, reducible oxides, and mixtures thereof. Burner catalyst is commercially available from a number of vendors known to those of skill in the art as small pellets. The pellets may be packed into burner chamber 105 to form a porous bed or otherwise suitably filled into the burner chamber volume. Burner catalyst pellet sizes may be varied relative to the cross sectional size of burner chamber 105.

As mentioned above, fuel processor 15 is intended for portable applications. In this case, burner 30 and its one or more burner chambers are sized for portable power generation. In one embodiment, the burner chamber has a volume less than about 5 cubic centimeters. One or more burner chambers with a volume less than about 3 cubic centimeters are suitable for lower power applications.

Air flow to the burner will also vary with the size and power output of the fuel cell system. In one embodiment, maximum air flow into the burner chamber 105 is less than about 50 liters per minute. A maximum air flow into the burner chamber 105 that is less than about 25 liters per minute is also suitable for lower power applications.

Fuel flow for burner 30 may also vary. In one embodiment, maximum burner fuel flow into the burner is less than about 100 milliliters per hour. Maximum fuel flow into the burner chamber 105 that is less than about 50 milliliters per hour is also suitable for lower power applications. Maximum fuel flow into the burner will also reduce depending on the electrical output of the device, as one of skill in the art will appreciate.

Heat generated in burner chamber 105 conducts through one or more walls of monolithic structure 100 to a reformer chamber 103 for reformer 32, where the heat facilitates the reforming process.

Reformer 32 processes fuel to produce hydrogen, and includes a reforming chamber 103. Internal walls in monolithic structure 100 and end walls on adaptor 90 and copper end plate 128 define dimensions of the reformer chamber 103.

Reformer chamber 103 includes a reforming catalyst. The reforming catalyst facilitates the production of hydrogen. For methanol, the catalyst produces hydrogen gas and carbon dioxide. In one embodiment, the catalyst comprises pellets (not shown) packed to form a porous bed or otherwise suitably filled into the volume of reformer chamber 103. Pellet diameters ranging from about 50 microns to about 1.5 millimeters are suitable for many fuel processors. Pellet diameters ranging from about 500 microns to about 1 millimeter are suitable for use with reformer 32. Pellet sizes may also vary with the cross sectional size of reformer chamber 103, e.g., as the reformer chambers increase in size so does catalyst pellet diameters. Pellet sizes and packing may also be varied to control the pressure drop that occurs through reformer 32 or each reformer chamber 103. In one embodiment, pressure drops from about 0.2 to about 3.5 psi gauge are suitable between the inlet and outlet of each reformer chamber 103. One suitable catalyst may include CuZn coated onto alumina pellets when methanol is used as a fuel. Other suitable catalysts include platinum, palladium, a platinum/palladium mix, nickel, and other precious metal catalysts for example. Catalyst pellets are commercially available from a number of vendors known to those of skill in the art. A wash coat of the desired metal catalyst material onto the walls of reformer chamber 103 may also be used with reformer 32.

The reformed products are then collected at a temporary storage chamber 119 before delivered to a fuel cell. An outlet port 39 on adaptor 90 (FIG. 2) communicates hydrogen produced in reformer 32 from storage chamber 119 to outside of fuel processor 15.

Heat generated in burner chamber 105 also conducts through one or more walls of monolithic structure 100 to a boiler 34. Since methanol reforming and hydrogen production via a catalyst in reformer 32 often requires elevated methanol temperatures, fuel processor 15 pre-heats the methanol before receipt by reformer 32 via boiler 34. As shown in the cross section of FIG. 2, boiler 34 is disposed in proximity to burner 30 to receive heat generated in burner 30. The heat transfers via conduction through material 141 in monolithic structure 100 from burner 30 to boiler 34 and via convection from boiler 34 walls to the methanol passing therethrough. In one embodiment, boiler 34 is configured to vaporize liquid methanol. Using the heat provided by the burner, fuel boils in the boiler 34 before exiting the boiler at a 180 degree turn 134 (FIG. 3).

Heated fuel then flows from the boiler 34 into reformer chamber 103, where it reforms, and finally exits at the opposite end of monolithic structure 100. In this embodiment, as shown in FIG. 3, a reformer entrance port 118 feeds a reformer fuel where it enters the fuel processor boiler 34. A second copper end piece 131 seals boiler 34 at the end of monolithic structure 100.

A low pressure source 41 (FIG. 2) such as a fan delivers air to the burner chamber 105. Before entering burner chamber 105, the air mixes with vaporized fuel from fuel inlet 114. While not shown, it is understood that a fan or other air source 41 may also be disposed at the downstream end of a burner and negatively draw air instead of positively pushing the air through a burner chamber 105.

In a specific embodiment, during startup, a fuel cell system runs anode exhaust from the fuel cell 20 back to fuel processor 15. As shown in FIG. 2, plumbing line 116 routes unused hydrogen from fuel cell 20 to a burner inlet, which provides the anode exhaust to burner 30. Burner 30 includes a thermal catalyst that reacts with the unused hydrogen to produce heat. Since hydrogen consumption within a PEM fuel cell 20 is often incomplete and the anode exhaust often includes unused hydrogen, re-routing the anode exhaust to burner 30 allows a fuel cell system to capitalize on unused hydrogen and increase hydrogen usage and energy efficiency.

Referring to FIG. 4, adapter 90 includes two alignment holes 111 and 112 to facilitate alignment and connection of adapter 90 and monolithic structure 100. Two alignment pins (115, see FIG. 4) are inserted into alignment holes 111 and 112 to facilitate brazing.

In operation, during fuel cell startup, liquid fuel enters via a burner fuel inlet pipe 114, which outputs the fuel proximate to a vaporizer 126. The fuel then vaporizes and mixes with the incoming air provided by air pressure source 41. The air/fuel mixture is then carried to burner chamber 105 where it combusts to generate heat for reformer 32.

Once the start up process is completed and the fuel processor has reached a desired temperature, the reformer receives fuel. This fuel mixture enters a delivery tube 117 and exits at a boiler entrance inlet 118. Once fuel as been reformed, the reforming products are fed to a temporary storage chamber 119, where they are eventually delivered to a fuel cell through a reformate delivery tube 39.

The fuel adapter 90 and the monolithic structure 100 may be joined together through a brazing process while the air pressure source 41 is attached to fuel adapter 90 with a high temperature glue. In another specific embodiment, fuel adapter 90 is made of steel or another low thermal conductivity material.

Figure 5:
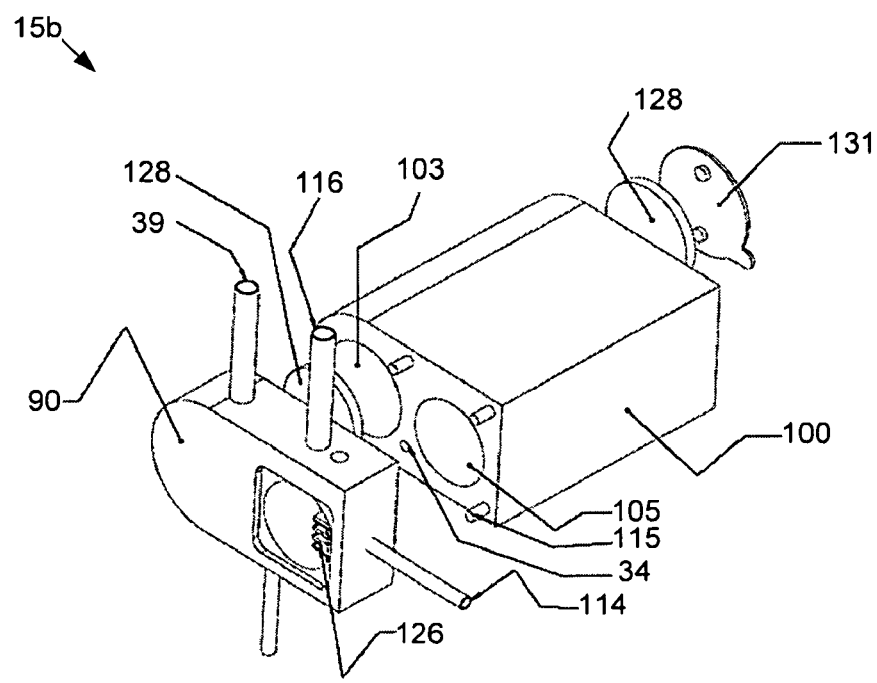
FIG. 5 shows an elevated and external perspective view of a low pressure drop fuel processor in accordance with another embodiment.

FIG. 5 shows an elevated and external perspective view of a low pressure drop fuel processor 15b in accordance with another embodiment. Fuel processor 15b is similar to that described above with respect to FIGS. 2-4, except for the circular cross section shape of the burner chamber 105 and reformer chamber 103.

Figure 6:
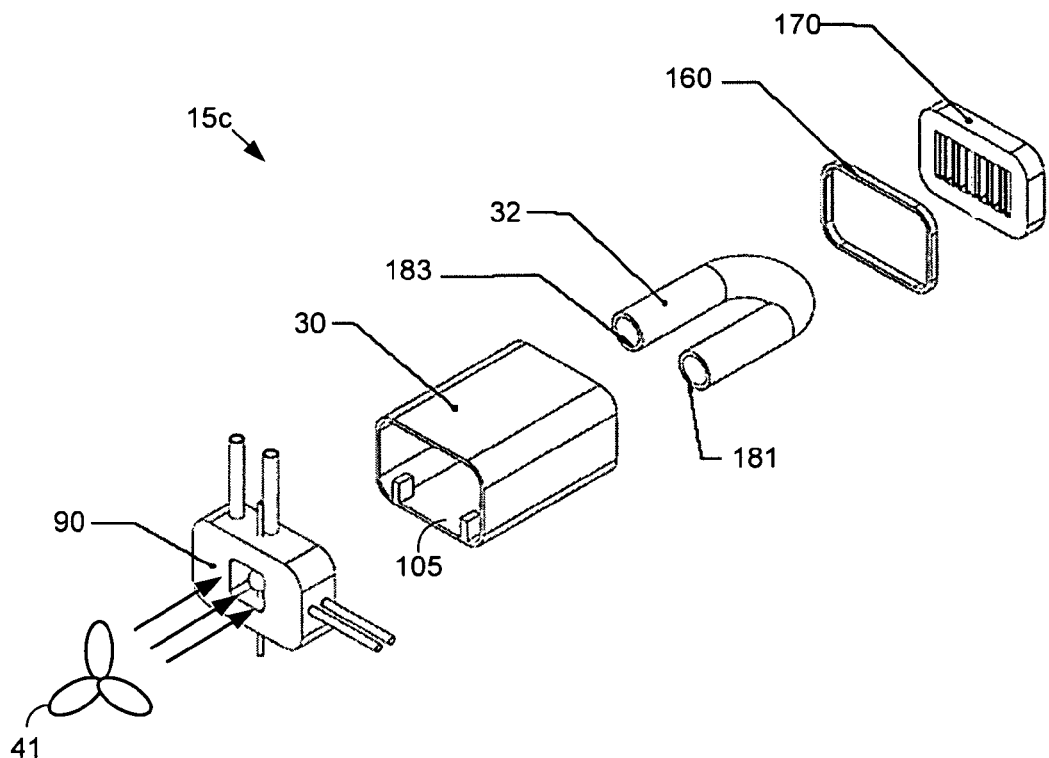
FIG. 6 shows an exploded top perspective view of an assembly for a portable low pressure drop fuel processor in accordance with another embodiment.

FIG. 6 shows an exploded top perspective view of an assembly for a portable low pressure drop fuel processor 15c in accordance with another embodiment. Fuel processor 15c includes six components: a fuel adapter 90, a burner 30, reformer 32, a heat exchanger 170, a fuel processor insulator 160, and a blower 41.

Figure 7:
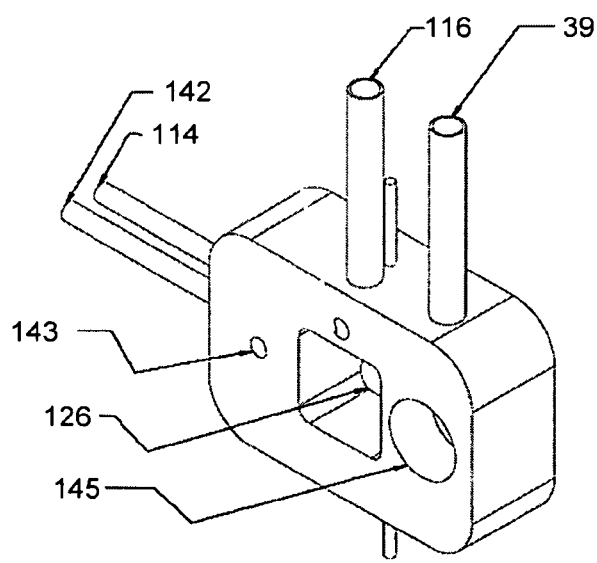
FIG. 7 shows greater details of adapter used in the low pressure drop fuel processor of FIG. 6.

Similar to FIGS. 2-5, fuel adapter 90 provides inlet and exit plumbing and also includes an air/fuel mixing chamber. FIG. 7 shows greater details of adapter 90. During fuel cell startup process, fuel enters via inlet pipe 114 where it strikes a vaporizer 126 that includes one or more heated surfaces. The fuel vaporizes and mixes with an incoming stream of ambient air and the mixture subsequently travels to a burner chamber 105. Reformer fuel enters a metal (e.g., steel) tube 142 and exits to the reformer chamber inlet 143. After the fuel reforms, the product travels to a temporary storage chamber 145. The fuel accumulates here until it travels to the fuel cell through a reformate delivery plumbing 39.

Fuel processor 15c comprises two independent structures: a burner 30 and a separable reformer 32. In the specific embodiment shown in FIG. 6, the burner 30 includes a hollow rectangular burner chamber 105 and extruded shape. The burner chamber 105 again includes no turns and both inlet and exit ends include a large opening.

The reformer 32 of fuel processor 15c includes a reformer chamber 103 pipe bent into a "U" shape. Fuel enters a reformer inlet 181 from the fuel adapter 90. The reformate exits at an outlet end of the tube 183. The long length of reformer chamber 103 allows increases heat transfer from the burner to the reformer, while its annular characteristic allows even heat distribution within the reformer body.

Fuel processor 15c includes a heat exchanger 170 that transfers heat from the hot burner exhaust gases to incoming fuel. This uses outward traveling waste heat in fuel processor 15 to increase thermal management and thermal efficiency of the fuel processor. Specifically, waste heat from burner 30 pre-heats incoming fuel provided to burner 30 (or reformer 32) to reduce heat transfer to the air within the burner. As a result, more combusted heat transfers from the burner 30 to reformer 32. The heat exchanger 170 also functions as insulation for the fuel processor. More specifically, by reducing the overall amount of heat loss from the fuel processor, heat exchanger 170 also reduces heat loss from package 11 by cooling exhaust gases before they escape fuel processor 15.

Figure 8:
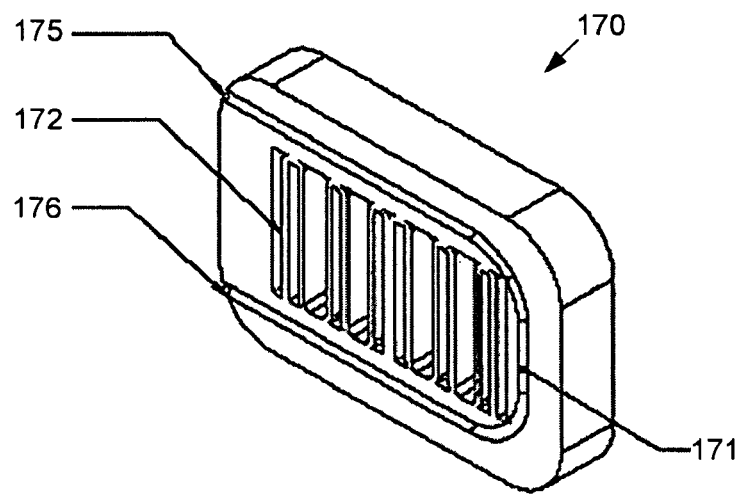
FIG. 8 shows a close up of the heat exchanger used in the low pressure drop fuel processor of FIG. 6.

In this case, the heat exchanger 170 attaches proximate to the burner exit at one end of fuel processor 15c. The heat exchanger 170 includes a frame 171 and high thermal conductive fins 172. In a specific embodiment, the fins 172 include copper or one or more other high thermal conductive materials that promote conductive heat transfer. FIG. 8 shows a close up of the heat exchanger 170 used in fuel processor 15c. As hot burner exhaust gases pass from the burner chamber 105 exit and through the heat exchanger 170 and contact with the copper fins 172, heat transfers from the exhaust gases to the fins. Because the heat exchanger 170 outer frame 171 is in contact with the copper fins, the frame 171 receives heat in the fins via conduction. Incoming fuel (for the reformer or burner) then enters the heat exchanger area 175 and circulates in the heat exchanger, receiving heat from the heat exchanger walls in frame 171, before exiting. At the exit 176, the fuel may be partially of fully vaporized and then is fed to the burner or reformer fuel inlet.

In a specific embodiment, an insulating material 160 is placed between the burner and the heat exchanger to reduce heat draw to the heat exchanger from heat directly from the burner.

Figure 9:
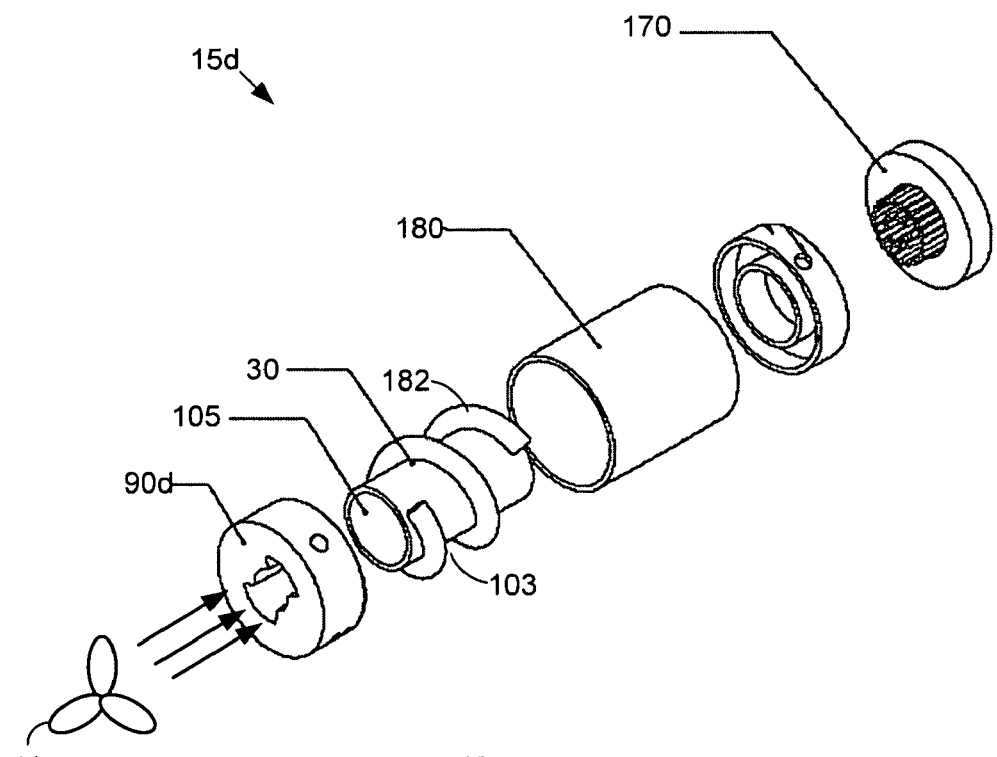
FIG. 9 shows an exploded top perspective view of a low pressure drop fuel processor in accordance with another specific embodiment.

FIG. 9 shows an exploded top perspective view of a low pressure drop fuel processor 15d in accordance with a specific embodiment. Fuel processor 15d includes a coaxial spiral design. The coaxial spiral fuel cell processor 15d includes 5 separated components as shown.

Burner 30 includes a cylindrical shape that allows catalyst to be inserted into its body. Burner fuel enters at the left end of the processor 15d where it combusts in a burner chamber 105 with air and exits at the opposite end of the burner chamber 105. Again, burner 30 includes a burner chamber 105 with no turns and a wide and consistent cross section along its straight length to reduce pressure required to move burner reactants and products along the length.

In an attempt to recover the exhaust heat, a heat exchanger 170 is added perpendicular to the exhaust stream where the recovered heat is used to vaporize incoming reformer fuel.

As fuel combusts in the cylindrical burner chamber 105, heat conducts through the burner walls to an external helical reformer 32. The reformer 32 includes a helical tube 182 that is wrapped around an external wall of the burner cylinder. Reformer catalyst is then filled in spaces between the helix pitch; the spaces then act as the reformer chamber 103. To prevent catalyst from falling out, a cylinder 180 of inner diameter equal to that of the helix outer diameter is added about the helical tube 182. This cylinder 180 creates a seal that serves as a thermal insulator and reformer chamber 103 wall for catalyst containment. As fuel enters the reforming chamber 103, it travels in a helical path where it reforms before passing to an outlet end. The helical pitch may vary to include a desired reformer chamber 103 size or to improve conduction with the burner 30.

Figure 10:
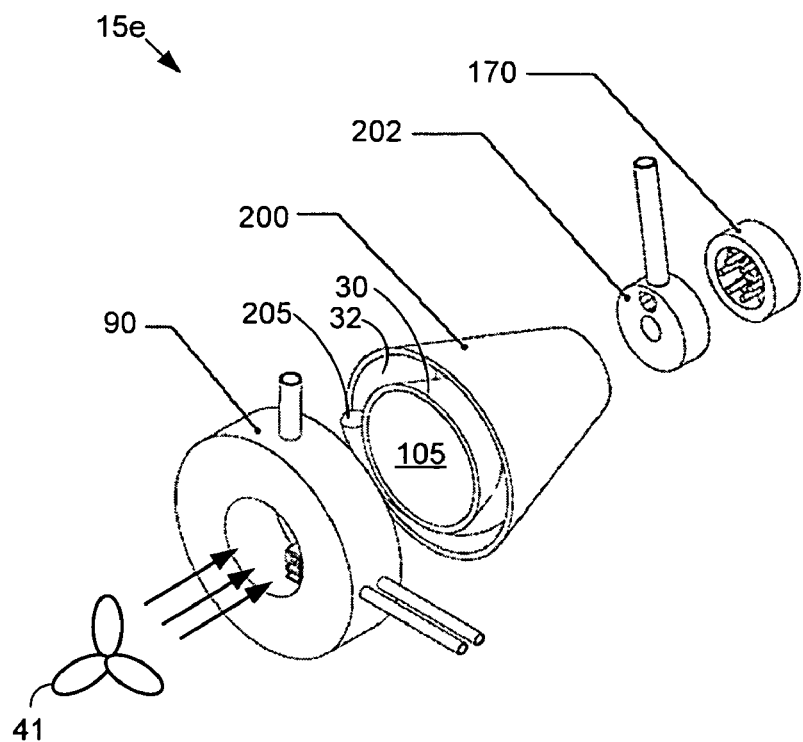
FIGS. 10 and 11 show an exploded perspective view of a 'coned spiral' fuel processor in accordance with another embodiment.
Figure 11:
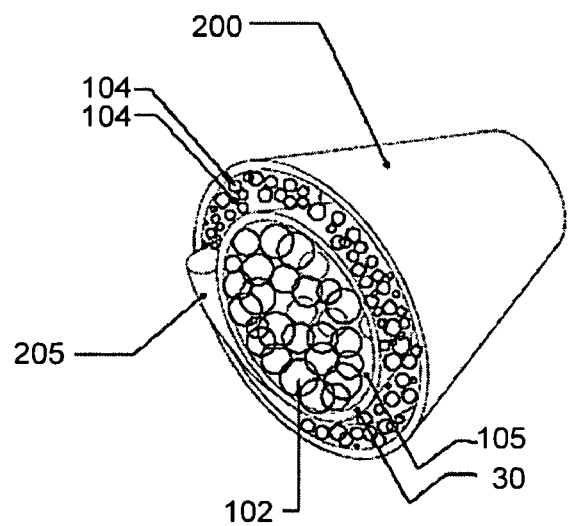

FIG. 10 shows an exploded perspective view of a 'coned spiral' fuel processor 15e in accordance with another embodiment. The coned spiral fuel cell processor 15e includes: an adapter 90, fuel processor core 200, reformer adapter 202, recuperator 170, and a blower 41.

The processor core 200 includes a burner 30 and reformer 32. Both the burner 30 and reformer 32 take a cone shape where the cross sectional area of both chambers decreases along their axial dimension. The burner 30 and reformer 32 are separated by a helix 205 that is wrapped around the burner 30. The burner chamber 105 is filled with burner pellet catalysts 102 (see FIG. 11), and may include an outer wall with small thickness and/or high conductivity to facilitate heat transfer to the reformer 32. To reduce pressure drop in the burner, the outlet end of chamber 105 does not taper to a point, giving the burner chamber 105 a frustoconical shape.

The space between the helical rod 205 pitch is filled with reformer catalyst 104, such as pellets. As reformer fuel enters the reformer chamber 103 from the fuel adapter 90, it travels in a helical path, guided by the helical rod 205.

Figure 12:
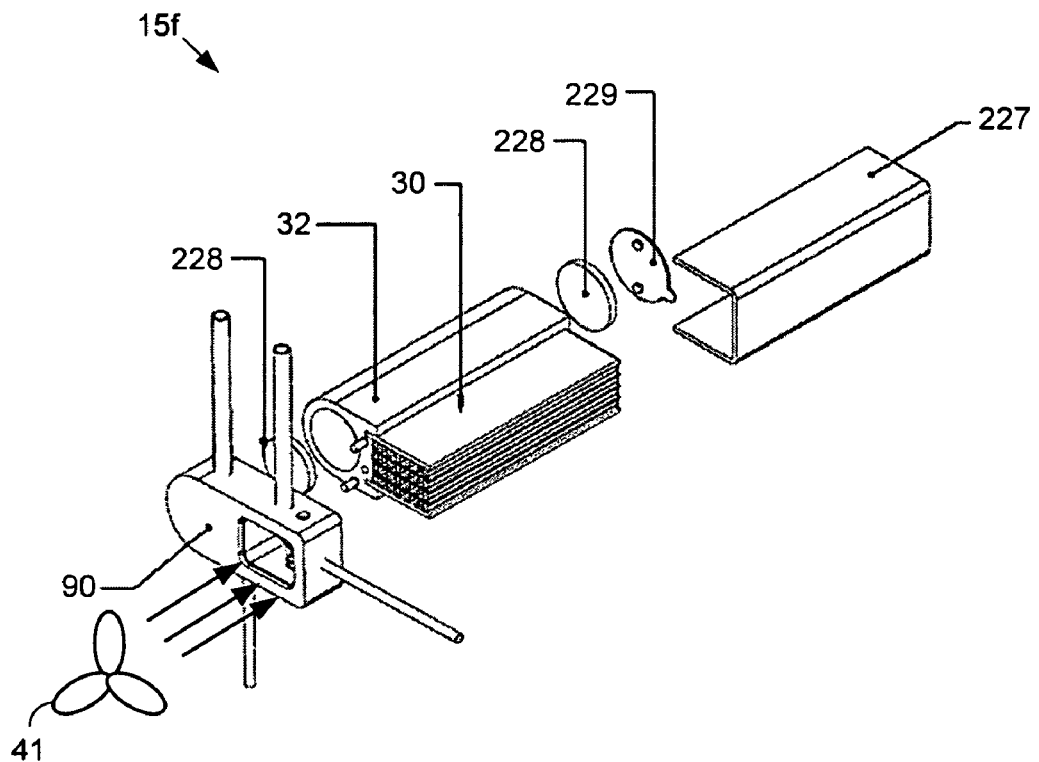
FIGS. 12 and 13 show a low pressure drop fuel processor in accordance with another embodiment.
Figure 13:
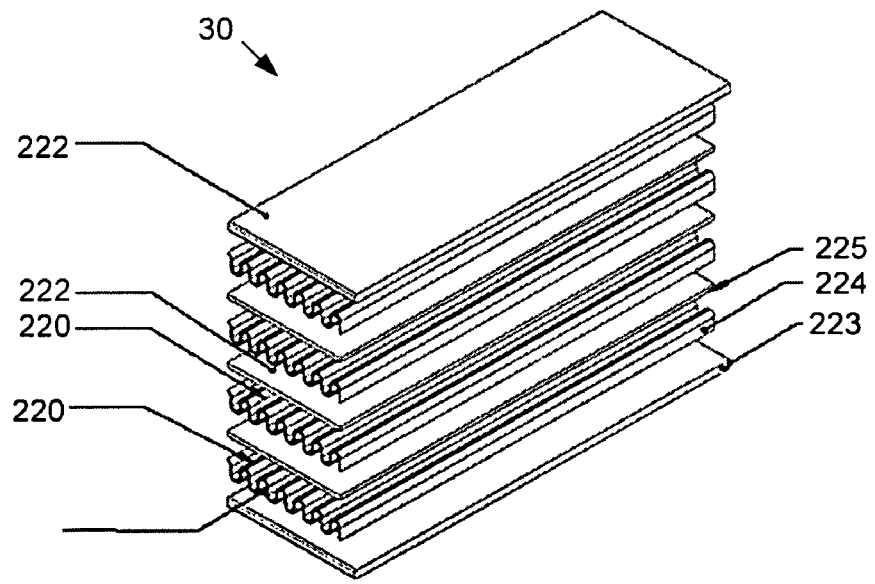

FIGS. 12 and 13 show a low pressure drop fuel processor 15f in accordance with another embodiment.

As shown in FIG. 13, a burner 30 with fins 220 and thin copper plates 222 where burner catalyst is wash-coated onto surfaces for both the fins 220 and plates 222. The fins 220 and plates 222 may include a suitable metal such as copper that facilitates conductive heat transfer. The fins and plates are attached (e.g., brazed) together at the highest points of the fins 220.

The fin side walls 224 and the plate side walls 223, 225 attach to a reformer wall. The attachment may be done by brazing, laser welding, high temperature glues or mechanical interference fits, for example. One suitable material for the fins/plates is copper due to its high thermal conductivity. Other materials such as ceramics, steels, metals, silicon etc may be used as well.

As fuel enters the burner from the fuel adapter 90, it flows through the fin channels where it combusts. Heat generated during the combustion process then transfers to the metal fins 220 and plates 222 where it conducts to the reformer 32 and the boiler.

Some heat, however, is lost via the burner exhaust. In order to reduce the burner heat lost to the environment, a thin but low conductivity "C" clamp 227 is attached around the burner. The clamp, however, does not touch the burner since that it may encourage conductive heat conduction.

In a specific embodiment, the reformer includes a metal porous plug 228 that prevents reformer catalyst pellets from falling out. The plug is placed at an end of the reformer where it is reinforced by a thin metal 229 plate. To improve contact between the reformer 32 and the burner 30 and to provide the ease of brazing, a small cut may be made into the reformer body. The cut limits the burner's movement once it is placed onto the reformer body to facilitate the brazing process.

Fuel Cell System

Figure 14:
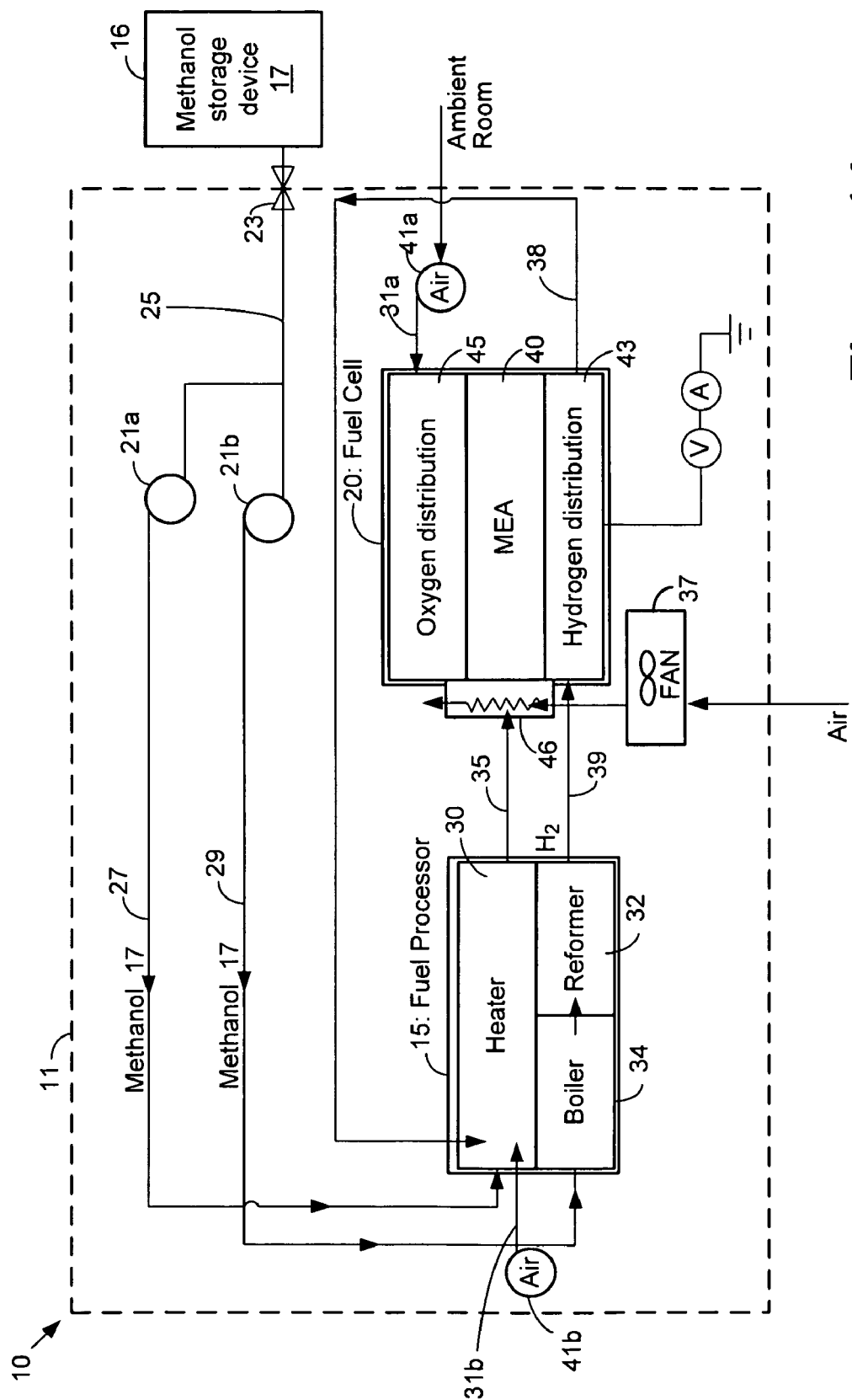
FIG. 14 illustrates schematic operation for a fuel cell system in accordance with a specific embodiment of the present invention.

FIG. 14 illustrates schematic operation for the fuel cell system 10 in accordance with a specific embodiment of the present invention.

Fuel storage device 16 stores methanol or a methanol mixture as a hydrogen fuel 17. An outlet of storage device 16 includes a connector 23 that mates with a mating connector on a package 11. In this case, the package 11 includes the fuel cell 20, fuel processor 15, and all other components except the cartridge 16. In a specific embodiment, the connector 23 and mating connector form a quick connect/disconnect for easy replacement of cartridges 16. The mating connector communicates methanol 17 into hydrogen fuel line 25, which is internal to package 11 in this case.

Line 25 divides into two lines: a first line 27 that transports methanol 17 to a heater/burner 30 for fuel processor 15 and a second line 29 that transports methanol 17 to a reformer 32 in fuel processor 15. Lines 25, 27 and 29 may comprise channels disposed in the fuel processor (e.g., channels in metals components) and/or tubes leading thereto.

Flow control is provided on each line 27 and 29. Separate pumps 21a and 21b are provided for lines 27 and 29, respectively, to pressurize each line separately and transfer methanol at independent rates, if desired. A model 030SP-S6112 pump as provided by Biochem, N.J. is suitable to transmit liquid methanol on either line in a specific embodiment. A diaphragm or piezoelectric pump is also suitable for use with system 10. A flow restriction may also be provided on each line 27 and 29 to facilitate sensor feedback and flow rate control. In conjunction with suitable control, such as digital control applied by a processor that implements instructions from stored software, each pump 21 responds to control signals from the processor and moves a desired amount of methanol 17 from storage device 16 to burner 30 and reformer 32 on each line 27 and 29. In another specific embodiment shown, line 29 runs inlet methanol 17 across or through a heat exchanger (not shown) that receives heat from the exhaust of the heater 30 in fuel processor 15. This increases thermal efficiency for system 10 by preheating the incoming fuel (to reduce heating of the fuel in burner 30) and recuperates heat that would otherwise be expended from the system.

Air source 41a delivers oxygen and air from the ambient room through line 31a to the cathode in fuel cell 20, where some oxygen is used in the cathode to generate electricity. Air source 41a may include a pump, fan, or blower, for example.

Low pressure air source 41b delivers oxygen and air from the ambient room through line 31b to burner 30. Low pressure air source 41b may a fan or blower, for example.

A fan 37 blows cooling air (e.g., from the ambient room) over fuel cell 20. Fan 37 may be suitably sized to move air as desired by heating requirements of the fuel cell; and many vendors known to those of skill in the art provide fans suitable for use with package 10.

Fuel processor 15 receives methanol 17 and outputs hydrogen. Fuel processor 15 comprises heater 30, reformer 32 and boiler 34. Burner 30 includes an inlet that receives methanol 17 from line 27 and a catalyst that helps generate heat from methanol. In another embodiment, burner 30 also includes its own boiler to preheat its inlet fuel.

Boiler 34 includes a boiler chamber having an inlet that receives methanol 17 from line 29. The boiler chamber is configured to receive heat from burner 30 and use the heat to boil the methanol passing through the boiler chamber. The structure of boiler 34 permits heat produced in burner 30 to heat methanol 17 in boiler 34 before reformer 32 receives the methanol 17. In a specific embodiment, the boiler chamber is sized to boil methanol before receipt by reformer 32. Boiler 34 includes an outlet that provides heated methanol 17 to reformer 32.

Line 39 transports hydrogen (or 'reformate') from fuel processor 15 to fuel cell 20. A hydrogen flow sensor (not shown) may also be added on line 39 to detect and communicate the amount of hydrogen being delivered to fuel cell 20. In conjunction with the hydrogen flow sensor and suitable control, such as digital control applied by a processor that implements instructions from stored software, fuel processor 15 regulates hydrogen gas provision to fuel cell 20.

Fuel cell 20 includes a hydrogen inlet port that receives hydrogen from line 39 and includes a hydrogen intake manifold that delivers the gas to one or more bi-polar plates and their hydrogen distribution channels. An oxygen inlet port of fuel cell 20 receives oxygen from line 31a; an oxygen intake manifold receives the oxygen from the port and delivers the oxygen to one or more bi-polar plates and their oxygen distribution channels. A cathode exhaust manifold collects gases from the oxygen distribution channels and delivers them to a cathode exhaust port and line 33, or to the ambient room. An anode exhaust manifold 38 collects gases from the hydrogen distribution channels and delivers them to the ambient room.

In one embodiment, fuel cell 20 is a low volume ion conductive membrane (PEM) fuel cell suitable for use with portable applications such as consumer electronics. In one embodiment, a PEM fuel cell includes a fuel cell stack having a set of bi-polar plates. A membrane electrode assembly (MEA) 40 is disposed between two bi-polar plates. Gaseous hydrogen distribution to the hydrogen gas distribution layer 43 in the MEA 40 occurs via a channel field on one plate while oxygen distribution to the oxygen gas distribution layer 45 in the MEA 40 occurs via a channel field on a second plate on the other surface of the membrane electrode assembly. While the present invention will mainly be discussed with respect to PEM fuel cells, it is understood that the present invention may be practiced with other fuel cell architectures.

In one embodiment, each bi-polar plate is formed from a single sheet of metal that includes channel fields on opposite surfaces of the metal sheet. The single bi-polar plate thus dually distributes hydrogen and oxygen: one channel field distributes hydrogen while a channel field on the opposite surface distributes oxygen. Multiple bi-polar plates can be stacked to produce the 'fuel cell stack' in which a membrane electrode assembly is disposed between each pair of adjacent bi-polar plates. In another embodiment, each bi-polar plate is formed from multiple layers that include more than one sheet of metal.

In the embodiment shown, the anode exhaust is piped back to fuel processor 15. In this case, system 10 comprises plumbing 38 that transports unused hydrogen from the anode exhaust to burner 30. For system 10, burner 30 includes two inlets: an inlet configured to receive fuel 17 and an inlet configured to receive hydrogen from line 38. In one embodiment, gaseous delivery in line 38 back to fuel processor 15 relies on pressure at the exhaust of the anode gas distribution channels, e.g., in the anode exhaust manifold. In another embodiment, an anode recycling pump or fan is added to line 38 to pressurize the line and return unused hydrogen back to fuel processor 15.

In one embodiment, fuel cell 20 includes one or more heat transfer appendages 46 that permit conductive heat transfer with internal portions of a fuel cell stack. In a specific heating embodiment as shown, exhaust of the heater 30 in fuel processor 15 is transported to the one or more heat transfer appendages 46 in fuel cell 20 during system start-up to expedite reaching initial elevated operating temperatures in the fuel cell 20. In a specific cooling embodiment, an additional fan 37 blows cooling air over the one or more heat transfer appendages 46, which provides dedicated and controllable cooling of the stack during electrical energy production.

In addition to the components shown in shown in FIG. 14, system 10 may also include other elements such as electronic controls, additional pumps and valves, added system sensors, manifolds, heat exchangers and electrical interconnects useful for carrying out functionality of a fuel cell system 10 that are known to one of skill in the art and omitted for sake of brevity. FIG. 14 shows one specific plumbing arrangement for a fuel cell system; other plumbing arrangements are suitable for use herein. Other alterations to system 10 are permissible, as one of skill in the art will appreciate.

While this invention has been described in terms of several preferred embodiments, there are alterations, permutations, and equivalents that fall within the scope of this invention which have been omitted for brevity's sake. It is therefore intended that the scope of the invention should be determined with reference to the appended claims.

What is claimed is:

1. A fuel processor for producing hydrogen from a fuel, the fuel processor comprising:
   a reformer configured to receive reformer fuel and to output hydrogen;
   a burner having i) only a single burner chamber, ii) a burner chamber air inlet configured to receive air from a fan or blower or other low pressure air source, iii) a burner chamber fuel inlet configured to receive burner fuel, and iv) a catalyst in the burner chamber that is selected to facilitate combustion of the burner fuel, and v) a burner chamber outlet configured to output combustion exhaust from the burner chamber, wherein the fuel processor comprises a single and integrated monolithic structure that includes a single material that forms four walls of the reformer and four walls of the burner chamber wherein the burner chamber and reformer chamber only have the four walls and include only one shared wall between the burner chamber and the reformer so as to permit conductive heat transfer from the burner chamber to the reformer; and a fluid mixing and storage chamber for mixing the air and vaporized burner fuel before the air and fuel enter the burner chamber, the fluid mixing and storage chamber connected to the monolithic structure, wherein the burner is configured to permit air flow from the burner chamber air inlet to the burner chamber outlet and through the burner chamber with a pressure drop less than about 50 Pa, wherein the airflow through the burner chamber has no turns from the burner chamber air inlet to the burner chamber outlet.

2. The fuel processor of claim 1 wherein the burner is configured to permit air flow from the burner chamber air inlet to the burner chamber outlet and though the burner chamber with a pressure drop less than about 25 Pa.

3. The fuel processor of claim 1 wherein the burner chamber has a volume less than about 5 cubic centimeters.

4. The fuel processor of claim 3 wherein the maximum air flow into the burner chamber is less than about 50 liters per minute.

5. The fuel processor of claim 3 wherein maximum burner fuel flow into the burner is less than about 100 milliliters per hour.

6. The fuel processor of claim 1 wherein the burner chamber includes a length less than about 15 centimeters from the burner chamber air inlet to the burner chamber outlet.

7. The fuel processor of claim 6 wherein the burner catalyst is coated onto pellets with a diameter less than about ⅛ inch.

8. The fuel processor of claim 1 wherein the burner includes a set of fins and plates that include a wash coating of the burner catalyst.

9. A fuel processor for producing hydrogen from a fuel, the fuel processor comprising:
a reformer configured to receive reformer fuel and to output hydrogen;
a burner that includes
  i) only a single burner chamber with a volume less than about 5 cubic centimeters,
  ii) a burner chamber air inlet configured to receive air from a fan or blower or other low pressure air source,
  iii) a burner chamber fuel inlet configured to receive burner fuel,
  iv) a catalyst in the burner chamber that is selected to facilitate combustion of the burner fuel,
  v) a burner chamber outlet configured to output combustion exhaust from the burner chamber,
  vi) no turns in the burner chamber from the burner chamber air inlet to the burner chamber outlet,
  vii) a length less than about 15 centimeters between the burner chamber air inlet and the burner chamber outlet, wherein the fuel processor comprises a single and integrated monolithic structure that includes a single material that forms four walls of the reformer and four walls of the burner chamber wherein the burner chamber and reformer chamber only have the four walls and include only one shared wall between the burner chamber and the reformer so as to permit conductive heat transfer from the burner chamber to the reformer; and
a fluid mixing and storage chamber for mixing the air and vaporized burner fuel before the air and fuel enter the burner chamber, the fluid mixing and storage chamber connected to the monolithic structure, wherein the burner is configured to permit air flow from the burner chamber air inlet to the burner chamber outlet and though the burner chamber with a pressure drop less than about 50 Pa.

10. The fuel processor of claim 9, wherein the burner is configured to permit air flow from the burner chamber air inlet to the burner chamber outlet and though the burner chamber with a pressure drop less than about 25 Pa.

11. The fuel processor of claim 9, wherein the maximum air flow into the burner chamber is less than about 50 liters per minute.

12. The fuel processor of claim 9, wherein maximum burner fuel flow into the burner is less than about 100 milliliters per hour.

13. A portable fuel cell system comprising:
a fuel processor including,
  a reformer configured to receive reformer fuel and to output hydrogen,
  a burner that has only a single burner chamber including i) a burner chamber air inlet configured to receive air from a fan or blower or other low pressure air source, ii) a burner chamber fuel inlet configured to receive burner fuel, and iii) a catalyst selected to facilitate combustion of the burner fuel, and iv) a burner chamber outlet configured to output combustion exhaust from the burner chamber, wherein the burner chamber has no turns from the burner chamber air inlet to the burner chamber outlet, wherein the fuel processor comprises a single and integrated monolithic structure that includes a single material that forms four walls of the reformer and four walls of the burner chamber wherein the burner chamber and reformer chamber only have the four walls and include only one shared wall between the burner chamber and the reformer so as to permit conductive heat transfer from the burner chamber to the reformer; and
  a fluid mixing and storage chamber for mixing the air and vaporized burner fuel before the air and fuel enter the burner chamber, the fluid mixing and storage chamber connected to the monolithic structure,
a fuel cell configured to receive hydrogen from the fuel processor and to output electrical energy; and
a low pressure air supply positioned to move air through the burner chamber, wherein the low pressure air supply is configured to provide a pressure that is less than about 50 Pa and is configured to supply air at a flow rate that is less than about 50 liters per minute to the burner chamber.

14. The portable fuel cell system of claim 13 wherein the burner chamber has a volume less than about 5 cubic centimeters.

15. The portable fuel cell system of claim 14 wherein the maximum air flow into the burner chamber using the low pressure air supply is less than about 50 liters per minute.

16. The portable fuel cell system of claim 14 wherein maximum burner fuel flow into the burner is less than about 100 milliliters per hour.

17. The portable fuel cell system of claim 13 wherein the burner chamber includes a length less than about 15 centimeters from the burner chamber air inlet to the burner chamber outlet.

18. The portable fuel cell system of claim 17 wherein the burner catalyst is coated onto pellets with a diameter less than about ⅛ inch.

19. The portable fuel cell system of claim 13 wherein the burner includes a set of fins and plates that include a wash coating of the burner catalyst.

* * * * *